UNITED STATES PATENT OFFICE.

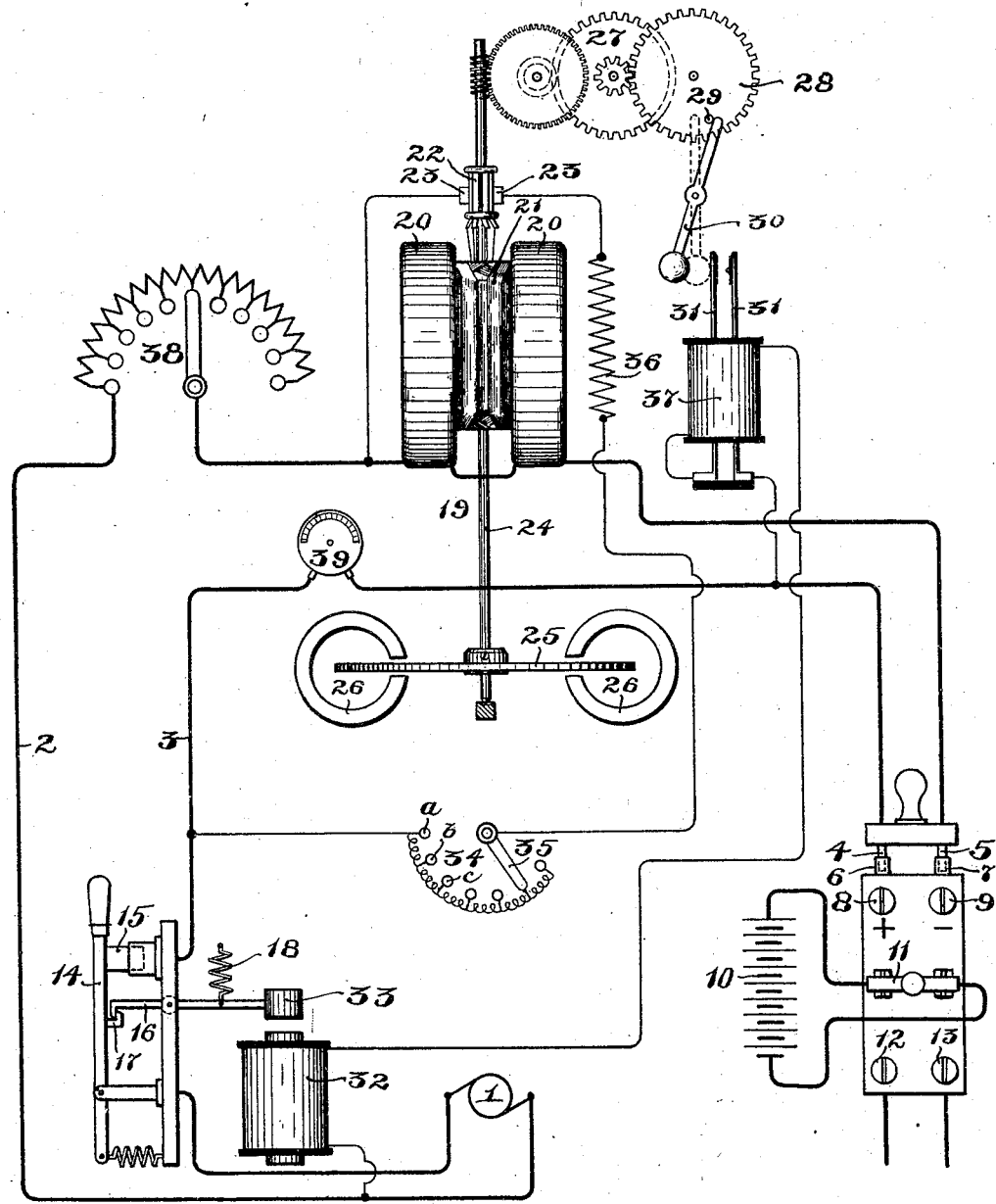

THOMAS DUNCAN, OF LAFAYETTE, INDIANA.

AUTOMATIC SWITCH FOR STORAGE BATTERIES.

No. 796,063.    Specification of Letters Patent.    Patented Aug. 1, 1905.

Application filed January 8, 1902. Renewed January 7, 1905. Serial No. 239,983.

*To all whom it may concern:*

Be it known that I, THOMAS DUNCAN, a citizen of the United States, residing at Lafayette, in the county of Tippecanoe and State of Indiana, have invented a certain new and useful Improvement in Storage Batteries, (Case No. 51,) of which the following is a full, clear, concise, and exact description, reference being had to the accompanying drawing, forming a part of this specification.

My invention relates to storage batteries, and has for its object the provision of improved means whereby the generator for charging the storage battery may be automatically cut out of circuit when the battery has been sufficiently charged. To this end I prefer to employ an electric motor that is adjusted to operate through a certain range during the charging of the battery, the motor when reaching the limit of its operation effecting the operation of a switch that opens the charging-circuit. The switch is not, preferably, directly controlled by the electric motor, but is associated with an electromagnet whose armature when unattracted serves to lock the switch in position. The circuit through this electromagnet is controlled by a motor, for which purpose a switch is preferably included in the magnet-circuit that is closed when the motor has been operated to an extent corresponding to the charge that the battery is designed to receive. The motor that I preferably employ is provided with current and pressure field-windings to produce rotation in proportion to the watts. There is preferably associated with this motor a train of wheels to secure the proper reduction in the speed of that part which directly governs the operation of the switch included in circuit with the controlling-magnet. This part is preferably in the form of a pin, with which there is associated a weighted pendulum that is engaged by the pin when the motor has reached the required maximum in its operation, the said pendulum being subsequently released by the pin to enable the pendulum as it swings to effect the closure of the governing-switch, which thereupon causes the release of the main switch in the charging-circuit to open the same.

The apparatus of my invention may also be adapted for use in connection with batteries having different capacities. To this end I prefer to associate with the motor a step-by-step adjusting resistance included in the same pressure-circuit with the armature of the motor, whereby the operation of the motor per unit of load or energy may be regulated. If, for example, the battery that is being charged is designed to receive one kilowatt-hour, the step-by-step switch may be placed at one position. If it is designed to have the battery receive two kilowatt-hours, the switch-arm of the step-by-step adjusting device is moved to another position, and so on throughout the entire range of battery capacities.

At the present time it is usual to connect the battery with a source of supply and allow it to remain in circuit until its electromotive force rises to a certain degree. This requires the attention of some person to watch a voltmeter included in the circuit, so that a manual switch may be operated to cut the battery out of circuit. By means of my invention the charging-machine is automatically cut out of circuit with the battery when the battery has received a predetermined amount of energy.

The invention is particularly useful in connection with automobile service, where the storage battery upon the vehicle may be connected in circuit with the charging source of current during the night, for example, when it is not desirable to have personal attention, and be automatically cut out of circuit when the battery has received its quota of energy. It is also particularly useful to those who are unacquainted with the operation of storage batteries.

I will explain my invention more fully by reference to the accompanying drawing, illustrating the preferred embodiment thereof in association with a storage battery and its charging-circuit.

In the drawing I have illustrated a mechanically-operated generator 1 in circuit with transmission-mains 2 3, that terminate in plugs 4 and 5, that may make connection with sockets 6 and 7 in electrical connection with the switch-contacts 8 and 9. The storage battery 10 has its terminals in the blades of a knife-switch 11, that are adapted for contact with the terminals 8 and 9 of the charging-circuit and the terminals 12 and 13 of the consumption-circuit to be supplied with energy from the storage battery. The circuit-opening switch has its blade 14 and its contact 15 included in the main conductor 3. A detent 16 engages a catch 17, provided upon the blade to normally hold the blade in closed circuit, a spring 18 acting yieldingly to maintain this engagement. This detent is controlled, as will be hereinafter more fully set forth, by means of a motor 19, having field-coils 20 included in the conductor 2 and an armature 21 included in bridge of the transmission-mains 2 and 3, said armature constituting the pressure-winding of the meter, the winding of the armature being connected with a commutator 22, with which brushes 23 23, included in the bridge-circuit, engage. The motor thus provided with these current and pressure fields produces rotation proportional to the energy passing from the charging-machine to the storage battery. To properly retard the rotation of the armature and the shaft 24, upon which it is mounted, a disk 25 may be provided upon the shaft to rotate within the fields of the permanent magnets 26. The motor structure illustrated is similar to that found in wattmeters and is provided with a wheel-train 27, which forms a part of the preferred instrumentality operating in conjunction with the motor for effecting a release of the switch 14 when the battery 10 has been sufficiently charged.

For the purpose of effecting the control of the switch 14 one of the wheels, as the wheel 28 of the counting-train, may be provided with a pin 29, which is rotated by the motor in a contra-clockwise direction and which is designed to actuate a weighted pendulum 30 once during each revolution. When the pendulum escapes the pin 29, the weight upon the pendulum effects the engagement of contact-springs 31 31, that are included in circuit with the magnet 32, whose armature 33 is carried by the centrally-pivoted detent 16. The magnet 32 is included in a bridge-conductor that also contains the springs 31, so that when these springs are forced into engagement by the pendulum the said magnet is energized to attract its armature 33, and thereby open the circuit including the charging-machine. It is preferably designed to have this operation of the switch parts 31 occur just when the battery has been sufficiently charged, for which purpose the motor 19 is designed to operate the wheel 28 during the time the battery is being charged, the operation of the meter having been timed to effect one complete revolution of the pin 29 to operate the magnet 32 while the battery is being charged.

If it should take a longer time to charge the battery than the motor is adjusted for, I provide means for modifying the rate of operation of the motor per unit of load or energy which preferably consists in the provision of extraneous resistance in the form of a rheostat 34, adapted to be included by sections in circuit with the armature, so as to modify the armature speed. For example, the rheostat-arm 35 when placed in contact with the button $a$ by only including the fixed armature resistance 36 in circuit with the armature may cause a single complete rotation of the pin 29 during the time the battery is being charged with one kilowatt-hour. If the battery is such as to require two kilowatt-hours, the button $b$ by connection with the arm 35 may so reduce the speed of the motor as to cause the pin 29 to effect but one complete revolution during the time the battery is receiving its charge. If the battery is designed for three kilowatt-hours, the switch-arm by contact with the button $c$ may properly reduce the speed of the armature, and so on throughout the range of adjustment of the rheostat.

There is also preferably included in circuit with the magnet 32 and in the same bridge therewith an additional magnet 37, whose core is preferably composed of the springs 31, that are made of iron. The springs 31 are magnetized with polarities of the same sign at the corresponding ends when the pendulum 30 forces the same into contact, so that upon the return stroke of the pendulum the springs 31 repel each other, the springs being provided with platinum contacts, which they engage. Immediately upon the disengagement of the pendulum from the springs 31 their similar polarity causes the same to be forced apart. The flux from the helix of the magnet 37 also destroys or blows out an arc between the points if any exists. Thus the said magnet separates the ends of the contacts 31 by repulsion and when they are separated blows out the arc that may arise between the springs, such an arc occurring if the switch 14 is opened after the springs 31 are separated. The normal position of the pendulum is shown in dotted lines.

In order that my invention may be practiced with batteries of different current and pressure values, I employ a resistance 38 in circuit with the coils 20 and 20 and an ammeter 39. If, for example, the battery requires ten amperes to charge it, the resistance 38 is adjusted until the ammeter 39 indicates ten amperes. If the meter has a capacity of fifty amperes and two hundred and fifty volts, then it is capable of operation with any battery that may be charged up to ten or twelve kilowatts.

When the storage battery is put into circuit by a connection with the supply-mains 2 and 3, the handle 35 is placed upon the required kilowatt-button and the switch of the series rheostat 38 is moved until the ammeter shows the correct charging current for the particular battery, after which the outfit may be left to itself, since the remainder of the operation is automatic.

It is obvious that changes may readily be made from the precise embodiment of my invention herein set forth without departing from its spirit, and I do not, therefore, wish to be limited to the precise arrangement set forth; but,

Having thus described my invention, I claim as new and desire to secure by Letters Patent—

1. The combination with a storage battery, of a charging-circuit for connection therewith, a switch for effecting disconnection between the storage battery and the charging-circuit, an electromagnet for effecting a change in the operative position of the switch, a motor included in the charging-circuit, a switch governed thereby for controlling the circuit through the magnet, and a second electromagnet included in circuit with the switch governing the aforesaid electromagnet, the said switch being composed of iron strips and constituting the core of the second electromagnet, substantially as described.

2. The combination with a storage battery, of a charging-circuit for connection therewith, a switch for effecting disconnection between the storage battery and the charging-circuit, an electromagnet for effecting a change in the operative position of the switch, a motor included in the charging-circuit, a switch governed thereby for controlling the circuit through the magnet, a second electromagnet included in circuit with the switch governing the aforesaid electromagnet, the said switch being composed of iron strips and constituting the core of the second electromagnet, and a pendulum adapted for operation by the said motor when it has been operated by the charging-current sufficiently, to effect a momentary closure of the switch controlling the first electromagnet, substantially as described.

3. The combination with a storage battery, of a charging-circuit for connection therewith, a switch for effecting disconnection between the storage battery and the charging-circuit, an electromagnet for effecting a change in the operative position of the switch, a motor included in the charging-circuit, a switch governed thereby for controlling the circuit through the magnet, a second electromagnet included in circuit with the switch governing the aforesaid electromagnet, the said switch being composed of iron strips and constituting the core of the second electromagnet, a pendulum adapted for operation by the said motor when it has been operated by the charging-current sufficiently, to effect a momentary closure of the switch controlling the first electromagnet, a train operated by the motor, and a pin carried upon a wheel of the train to effect the operation of the pendulum, substantially as described.

4. The combination with a storage battery, of a charging-circuit for connection therewith, a switch for effecting disconnection between the storage battery and the charging-circuit, an electromagnet for effecting a change in the operative position of the switch, a motor included in the charging-circuit, a switch governed thereby for controlling the circuit through the magnet, a second electromagnet included in circuit with the switch governing the aforesaid electromagnet, the said switch being composed of iron strips and constituting the core of the second electromagnet, a pendulum adapted for operation by the said motor when it has been operated by the charging-current sufficiently, to effect a momentary closure of the switch controlling the first electromagnet, a train operated by the motor, a pin carried upon a wheel of the train to effect the operation of the pendulum, an ammeter in the charging-circuit, and an adjusting resistance included in series in the charging-circuit, substantially as described.

5. The combination with a storage battery, of a charging-circuit for connection therewith, a switch for effecting disconnection between the storage battery and the charging-circuit, an electromagnet for effecting a change in the operative position of the switch, a motor having current and pressure field-windings, included in the charging-circuit, a switch governed thereby for controlling the circuit through the magnet, a second electromagnet included in circuit with the switch governing the aforesaid electromagnet, the said switch being composed of iron strips and constituting the core of the second electromagnet, a pendulum adapted for operation by the said motor when it has been operated by the charging-current sufficiently, to effect a momentary closure of the switch controlling the first electromagnet, a train operated by the motor, a pin carried upon a wheel of the train to effect the operation of the pendulum, an ammeter in the charging-circuit, an adjusting resistance included in series with the current-winding of the motor, and an adjusting resistance included in series with the pressure-winding of the motor, substantially as described.

6. The combination with a storage battery, of a charging-circuit for connection therewith, a switch for effecting separation between the storage battery and the charging-circuit, a detent for maintaining the switch in a closed position, an electromagnet having an armature for operating the detent to release the switch, a motor having current and pressure field-windings, in the charging-circuit, a switch controlled by the motor for closing circuit through the said electromagnet to effect a release of the switch when a predetermined quantity of current has been charged into the battery, the said motor having a train, a pin mounted upon one of the wheels of the train, and a pendulum adapted for engagement by the pin and adapted to effect a closure of the switch controlling the aforesaid electromagnet, substantially as described.

7. The combination with a storage battery, of a charging-circuit for connection therewith, a switch for effecting separation between the storage battery and the charging-circuit, a detent for maintaining the switch in a closed position, an electromagnet having an armature for operating the detent to release the switch, a motor having current and pressure field-windings, in the charging-circuit, a switch controlled by the motor for closing circuit through the said electromagnet to effect a release of the switch when a predetermined quantity of current has been charged into the battery, an ammeter, and an adjusting resistance in series with the current field-winding of the motor, substantially as described.

8. The combination with a storage battery, of a charging-circuit for connection therewith, a switch for effecting separation between the storage battery and the charging-circuit, a detent for maintaining the switch in a closed position, an electromagnet having an armature for operating the detent to release the switch, a motor having current and pressure field-windings, in the charging-circuit, a switch controlled by the motor for closing circuit through the said electromagnet to effect a release of the switch when a predetermined quantity of current has been charged into the battery, an ammeter, an adjusting resistance in series with the current field-winding of the motor, and an adjusting resistance in circuit with the pressure-winding of the motor, substantially as described.

9. The combination with a storage battery, of a charging-circuit for connection therewith, a switch for effecting separation between the storage battery and the charging-circuit, a detent for maintaining the switch in a closed position, an electromagnet having an armature for operating the detent to release the switch, a motor having current and pressure field-windings, in the charging-circuit, a switch controlled by the motor for closing circuit through the said electromagnet to effect a release of the switch when a predetermined quantity of current has been charged into the battery, and an adjusting resistance in circuit with the pressure-winding of the motor, substantially as described.

In witness whereof I hereunto subscribe my name.

THOMAS DUNCAN.

Witnesses:
 SAMUEL R. BACHTEL,
 FRANK V. NELSON.